June 3, 1924.

A. B. ROE ET AL

BOOK DRILLING MACHINE

Filed Nov. 19, 1920  3 Sheets-Sheet 1

1,496,171

Alexander B. Roe
Nelson S. Welk  INVENTORS
David R. Jenner

BY

Dodson + Roe ATTORNEYS

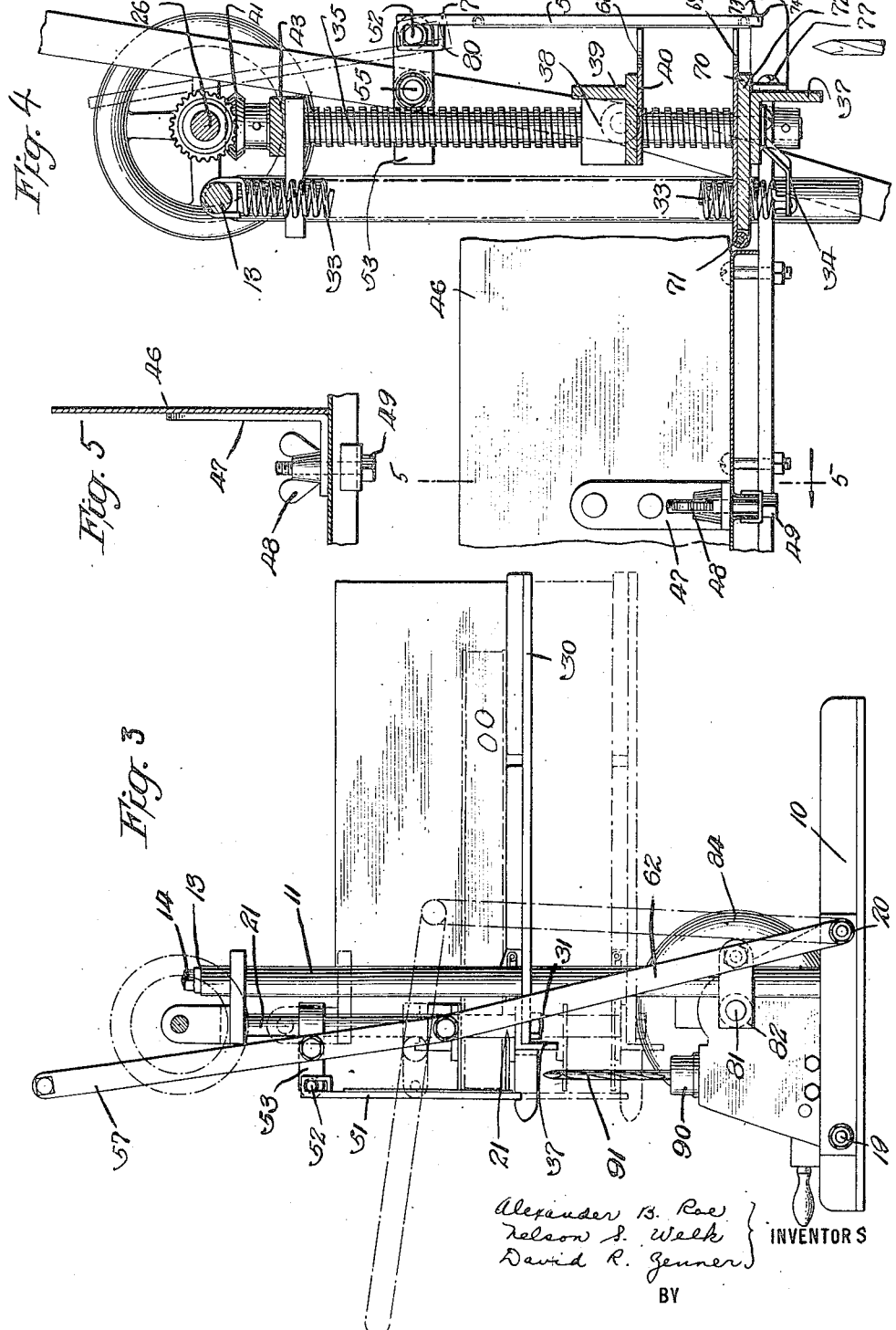

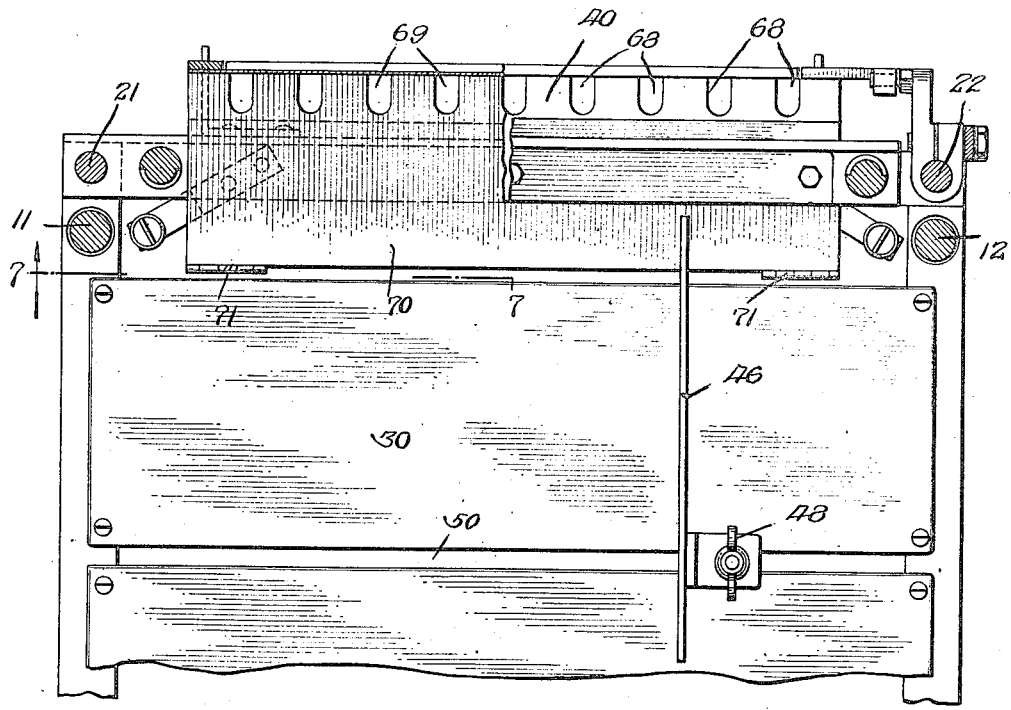
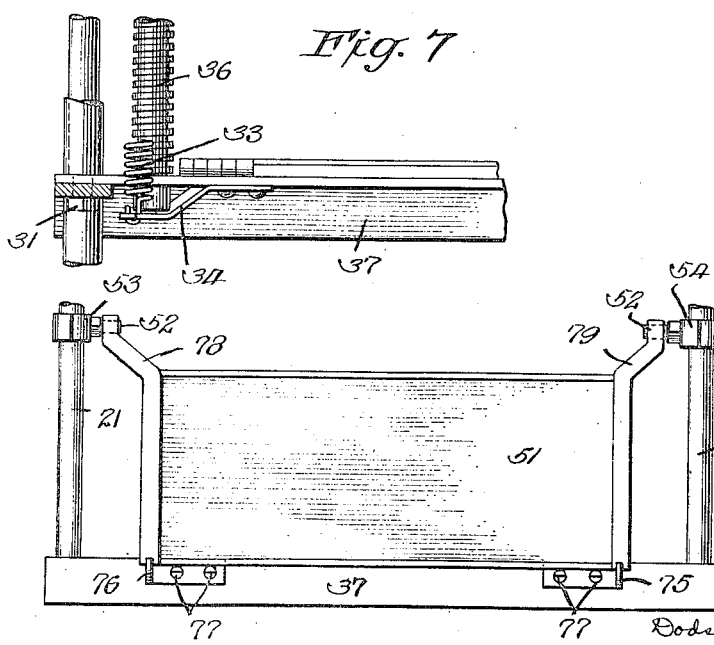

Patented June 3, 1924.

1,496,171

UNITED STATES PATENT OFFICE.

ALEXANDER B. ROE, NELSON S. WELK, AND DAVID R. ZENNER, OF ATHENS, OHIO, ASSIGNORS TO THE McBEE BINDER COMPANY, OF ATHENS, OHIO, A CORPORATION OF OHIO.

BOOK-DRILLING MACHINE.

Application filed November 19, 1920. Serial No. 425,198.

*To all whom it may concern:*

Be it known that we, ALEXANDER B. ROE, NELSON S. WELK, and DAVID R. ZENNER, citizens of the United States, residing at Athens, in the county of Athens and State of Ohio, have invented a certain new and useful Improvement in Book-Drilling Machines, of which the following is a specification.

Our invention relates to that class of devices which are designed to bind loose-leaf records into a permanent bound volume in order to preserve them, and has for its object to provide a machine which will accomplish this result in a much simpler and inexpensive manner than any of the machines with which we are familiar. Other objects of the invention will appear from the hereinafter contained description and claims.

Our means of accomplishing the foregoing objects may be more readily understood by having reference to the accompanying drawings which are hereunto annexed and are a part of this specification, in which—

Fig. 3 is an end elevation.

Fig. 4 is an enlarged fragmentary view of a portion of the machine taken on the line 4—4 in Fig. 1.

Fig. 5 is an enlarged fragmentary detail view taken on the line 5—5 in Fig. 4.

Fig. 6 is a fragmentary detail view taken on the line 6—6 in Fig. 1.

Fig. 7 is a fragmentary detail view taken on the line 7—7 in Fig. 6.

Fig. 8 is a side view of the evener plate.

Similar reference numerals refer to similar parts throughout the entire description.

Figure 1:
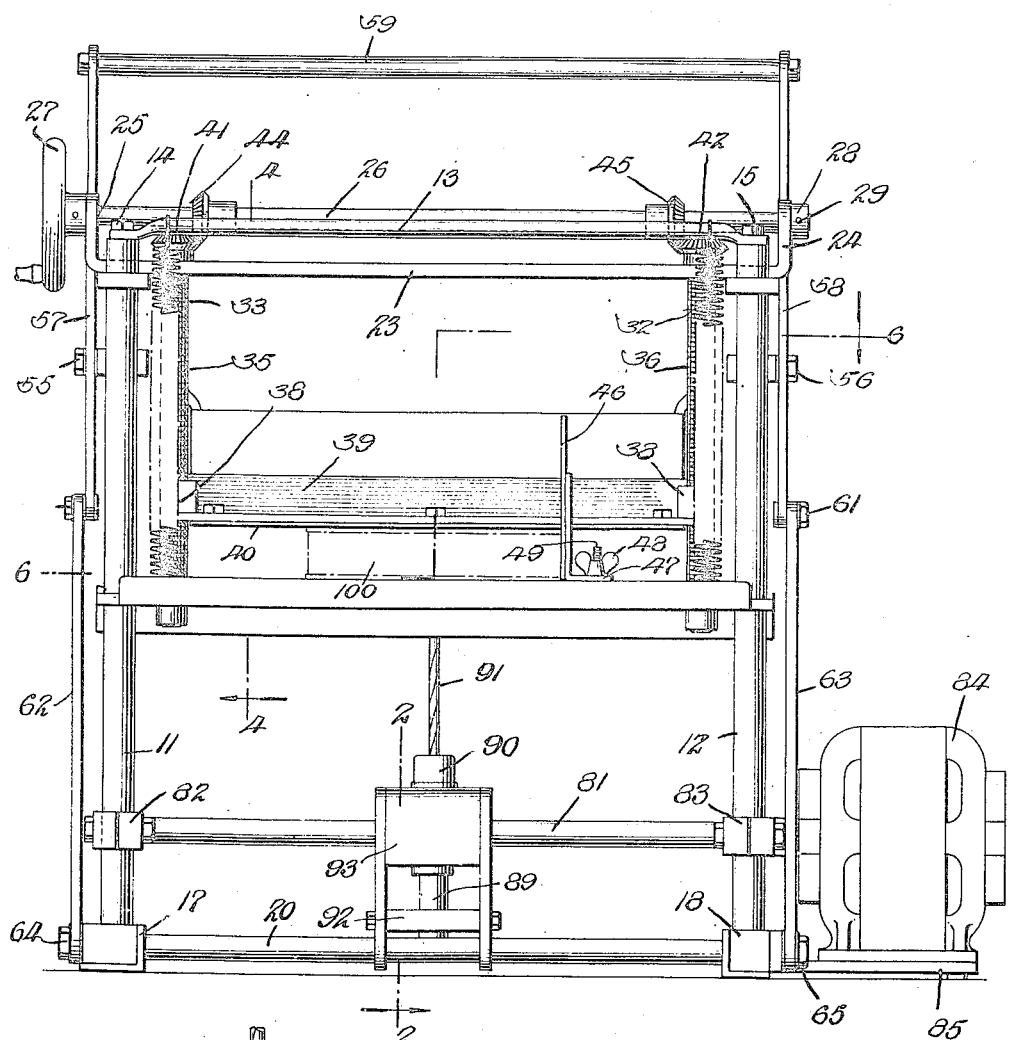
Fig. 1 is a side elevation of a machine constructed in accordance with our improvement.

As shown in the drawings, the machine comprises a frame, which has a base 10 consisting of two angle irons 17 and 18 which are connected by means of parallel shafts 19 and 20, and provided with two uprights 11 and 12 which are connected by means of a cross brace 13 secured to the top of the uprights 11 and 12 by means of bolts 14 and 15 respectively.

Adjacent the uprights 11 and 12 are two shorter uprights 21 and 22. These shafts are connected by means of a cross brace 23 which is bolted to the top of the uprights 21 and 22. The ends 24 and 25 of the cross brace 23 are then bent upwardly and are provided with bearings in which is mounted a shaft 26, from one end of which is mounted a hand wheel 27, and the other end, a collar 28 which is suitably secured by a pin or set screw 29. Secured to the lower ends of the uprights 21 and 22 is a table 30 being suitably secured thereto by means of bolts 31.

The table is provided with openings through which the uprights 11 and 12 pass, so that it is vertically slidable on said uprights. The table is normally held in position by means of the tension exerted by two coil springs 32 and 33, a portion only of the springs being shown, it being obvious that they extend from the cross bar or brace 13 to an angle plate 34, which is suitably secured to the lower part of the table 30.

Just inside of the uprights 21 and 22 we mount two threaded shafts 35 and 36, the lower ends of which are rotatably mounted in an angle bar 30 which is employed to stiffen the edge of the table, the flat or horizontal portion of which extends intermediate the bolts 31 and the ends of the uprights 21 and 22 respectively. Mounted upon the threaded shafts 35 and 36 are threaded blocks 38 which are rigidly secured to an angle bar 39 to which is bolted a pressure bar 40, the purpose of which will be hereinafter explained.

The upper ends of the threaded shafts 35 and 36 have fixedly mounted thereon miter gears 41 and 42. The hubs of these gears rest upon a cross brace 43 in which is provided journal bearings for the shafts 35 and 36 to rotate in. The teeth of the gears 41 and 42 are in mesh with miter gears 44 and 45 which are fixedly secured to the shaft 26 and rotate therewith.

Upon the table 30 is mounted an adjustable evening device 46 which is provided with a lug 47 which is secured in position by a wing nut 48 carried by a bolt 49 mounted in the slot 50 formed in the table 30 so that the evening device can be adjusted upon the plane of the table for any desired size of book.

We also provide a swinging evening plate 51 which is carried by pins 52 which are engaged by arms 78 and 79, the upper ends of which are formed as clearly seen in Fig. 4 with a rectangular portion 80 so as to permit of a vertical as well as a swinging movement of the evening plate 51. The lower edge 73 of the evening plate 51 is adapted to rest in notches 74 formed in outwardly projecting lugs 75 and 76 which are suitably secured by means of screws 77 to the angle bar 37. The pins 52 are carried by lugs 53 and 54 which are secured to the upright shafts 21 and 22 by means of bolts 55 and 56. These bolts carry links 57 and 58, the upper ends of which are connected by a rod 59 which forms a suitable handle. The lower ends of the links are connected by means of pivots 60 and 61 to links 62 and 63 which are pivotally attached to the sides of the base 10 by nuts 64 and 65 mounted upon the ends of the shaft 20.

The edge of the pressure plate 40 is provided with a plurality of notches 68 which may be any desired distance apart and which are in register with and correspond to a similar series of notches 69 formed in a hinged plate 70 which is suitably secured by means of hinges 71 adjacent the side of the table 30 and in the same plane therewith. This plate 70 rests normally upon a plate 72 which is secured to the flat or horizontal portion of the angle bar 37.

Figure 2:
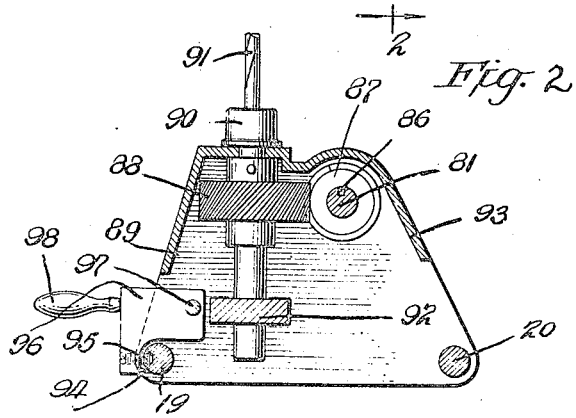
Fig. 2 is an enlarged sectional view taken on the line 2—2 in Fig. 1.

The mechanism for drilling the volumes is most clearly seen in Figs. 1 and 2. We provide a driving shaft 81 which is mounted in suitable bearings 82 and 83 which are secured to the uprights 11 and 12. The outer end of the shaft 81 is directly connected to an electric motor 84 which is attached to a base plate 85 which is suitably secured to the angle bar 18 of the frame. The shaft 81 has a keyway 86 extending longitudinally thereof and splined upon it is a spiral gear 87 which meshes with a spiral gear 88 mounted upon a vertical shaft 89 to which is secured a chuck 90 in which is mounted a drill 91, the vertical shaft being mounted in a suitable bearing formed in a bar 92 which is supported by the frame of a casing 93 which is adapted to enclose the worm and gear and is slidable upon the parallel shafts 19 and 20 which act as guides therefor.

The shaft 19 is provided with a plurality of circular recesses or notches 94, which are engaged by a spring pressed plunger 95 carried by a latch 96 which is pivotally mounted upon a pin 97, the latch being provided with a handle 98 for manual operation.

The operation of our device is as follows:

The adjustable evening device 46 is placed in the desired position and the volume 100 indicated by dotted lines in Figs. 1 and 3, is placed in position against it. The swinging evening plate is placed in the notches 73 which prevent it from swinging upon the pins 52 and the back of the volume 100 is pushed against the swinging evening plate until the leaves are flush with the two backs. The hand wheel 27 is then rotated and this in turn rotates the gears 44 and 45 which rotate the gears 41 and 42 which obviously turn the threaded shafts 35 and 36, and since these shafts are stationary obviously, the threaded blocks 38 are caused to move upon the shaft carrying with it the pressure plate 40. The volume is now held ready for drilling. The casing 93 is moved along upon the parallel guide shafts 19 and 20 until it is in register with the notches 68 and 69 which are in the correct position to provide for the binding rivets in the volume 100. The latch is then pressed down through the medium of the handle 98 and the spring pressed plunger enters one of the recesses 94, formed in the guide shaft 19 thus holding the drilling mechanism against longitudinal movement. The current is then turned on to the motor 84 causing the rotation of the shaft 81 and this through the medium of the worm 88 and vertical shaft 89, to rotate the drill 91.

The operator then grasps the bar 59 and by moving it outwardly and downwardly, as indicated by the dotted lines, it is apparent that the table 30 will move downwardly, as clearly indicated by the dotted lines in Fig. 3 until the drill has passed entirely through the volume 100, when by releasing the pressure upon the bar 59, the springs 32 and 33 will restore the table to its normal position. The handle 98 of the latch 96 is then raised, releasing the spring pressed plunger 95 from the recess 94 in the guide shaft 19, and the casing 93 is moved along until it is in the position where it is desired to drill the next hole in the volume. When the latch is pressed down, the operation just described is repeated and this is continued until the volume is drilled with the desired number of holes. The swinging evening plate is then raised out of the notches 73 and swung upwardly in the position indicated by the dotted lines in Fig. 4, when the binding rivets are then inserted, and by releasing the pressure upon the volume by the rotation of the hand wheel 27 in the opposite direction, the volume can be withdrawn, which movement is facilitated by the action of the hinged pressure plate 70.

It will be obvious to persons skilled in the art, from the hereinbefore contained description, that we have done away with a large number of moving parts, and yet have produced a machine which will bind volumes for preservation of loose leaves in a very satisfactory manner.

Having described our invention what we regard as new and desire to secure by Letters Patent is:

1. In a book drilling machine, the combination with a main frame of a table to retain the material to be drilled; a horizontally traveling drill underlying the table and provided with means for retaining it stationary at desired positions; means to force the table downwardly and cause the drill to penetrate the material to be drilled; means to rotate the drill, substantially as shown and described.

2. In a book drilling machine, the combination with a main frame of a table to receive the material to be drilled, with means for holding the material in position thereon; a horizontally traveling drill underlying the table and means for retaining the drill stationary in any desired position; means to force the table downwardly and cause the drill to penetrate the material to be drilled; means to rotate the drill, substantially as shown and described.

3. In a book drilling machine, the combination with a main frame of a table to receive the material to be drilled, with means to even the material, and means to hold the material in stationary position; a horizontally traveling drill underlying the table with means to retain the drill in stationary position at desired points; means to force the table downwardly and cause the drill to penetrate the material to be drilled; means to rotate the drill, substantially as shown and described.

4. In a book drilling machine, the combination with a main frame of a movable table held in normal position by spring compression, with means to even the sheets of the book, to be drilled, which are placed upon the table, and means to compress the material and hold it in position; a horizontally traveling drill underlying the table with means to retain the drill stationary at desired points; means to force the table downwardly against the spring compression and cause the drill to penetrate the material to be drilled; means to rotate the drill, substantially as shown and described.

5. In a book drilling machine, the combination with means for receiving, compressing and drilling the volume, of a swinging evening plate mounted in advance of the receiving, compressing and drilling means, with means for retaining the evening plate against the edge of the table, and means for holding the evening plate in an elevated position, substantially as shown and described.

In testimony whereof, we have signed the foregoing specification.

ALEXANDER B. ROE.
NELSON S. WELK.
DAVID R. ZENNER.